US009473740B2

(12) United States Patent
Schaefer et al.

(10) Patent No.: US 9,473,740 B2
(45) Date of Patent: Oct. 18, 2016

(54) AUTOMATIC POSITIONING OF VIDEOCONFERENCE CAMERA TO PRESENTER AT PRESENTATION DEVICE

(71) Applicants: Stephen P. Schaefer, Cedar Park, TX (US); Alain Nimri, Austin, TX (US)

(72) Inventors: Stephen P. Schaefer, Cedar Park, TX (US); Alain Nimri, Austin, TX (US)

(73) Assignee: Polycom, Inc., San Jose, CA (US)

(*) Notice: Subject to any disclaimer, the term of this patent is extended or adjusted under 35 U.S.C. 154(b) by 204 days.

(21) Appl. No.: 13/659,028

(22) Filed: Oct. 24, 2012

(65) Prior Publication Data

US 2014/0111600 A1   Apr. 24, 2014

(51) Int. Cl.
*H04N 7/14* (2006.01)
*H04N 7/15* (2006.01)
*H04N 5/232* (2006.01)

(52) U.S. Cl.
CPC ............... *H04N 7/15* (2013.01); *H04N 5/232* (2013.01); *H04N 7/147* (2013.01)

(58) Field of Classification Search
CPC .................. H04N 5/232; H04M 3/56–3/569; H04M 2203/50–2203/509
USPC ......... 370/259–271, 351–357; 709/201–207, 709/217–248
See application file for complete search history.

(56) References Cited

U.S. PATENT DOCUMENTS

| 4,400,724 | A | * | 8/1983 | Fields ........................... 348/14.1 |
| 4,516,156 | A |   | 5/1985 | Fabris et al. |
| 5,528,289 | A | * | 6/1996 | Cortjens et al. ........... 348/211.9 |
| 5,767,897 | A |   | 6/1998 | Howell |
| 5,872,922 | A |   | 2/1999 | Hogan et al. |
| 5,959,667 | A | * | 9/1999 | Maeng ..................... 348/211.99 |
| 6,256,033 | B1 |   | 7/2001 | Nguyen |
| 6,313,853 | B1 |   | 11/2001 | Lamontage et al. |
| 6,519,639 | B1 | * | 2/2003 | Glasser et al. ................. 709/224 |
| 6,674,458 | B1 | * | 1/2004 | Cohen-Solal et al. ...... 348/14.08 |
| 6,763,379 | B1 | * | 7/2004 | Shuster ......................... 709/224 |
| 6,799,209 | B1 | * | 9/2004 | Hayton ......................... 709/223 |
| 6,803,906 | B1 |   | 10/2004 | Morrison et al. |
| 6,919,880 | B2 |   | 7/2005 | Morrison et al. |

(Continued)

FOREIGN PATENT DOCUMENTS

| EP | 1178683 | 2/2002 |
| EP | 1503588 | 2/2005 |

(Continued)

OTHER PUBLICATIONS

Smart Technologies, "SMART—3000i Features," obtained from http://www2.smarttech.com/, copyright 2006, 6-pgs.

(Continued)

*Primary Examiner* — Hemant Patel
(74) *Attorney, Agent, or Firm* — Blank Rome, LLP (57) ABSTRACT

In a system and method of conducting a videoconference, a videoconferencing unit detects an activation related to a presentation device at a near-end of the videoconference. The unit stores a current orientation of at least one camera and directs the at least one camera at the presentation device. At this point, the unit begins outputting to a far-end at least one of (i) video captured of the presentation device with the at least one directed camera and (ii) content displayed with the presentation device. At some point, the unit detects a deactivation related to the presentation device at the near-end and then redirects the at least one camera to the stored orientation so the videoconference can proceed as before.

22 Claims, 8 Drawing Sheets

(56) References Cited

U.S. PATENT DOCUMENTS

| | | | |
|---|---|---|---|
| 6,947,032 B2 | 9/2005 | Morrison et al. | |
| 7,355,593 B2 | 4/2008 | Hill et al. | |
| 7,428,000 B2 | 9/2008 | Cutler et al. | |
| 7,532,206 B2 | 5/2009 | Morrison et al. | |
| 7,711,815 B2* | 5/2010 | Garg et al. | 709/224 |
| 7,770,115 B2 | 8/2010 | Gallmeier et al. | |
| 8,094,193 B2* | 1/2012 | Peterson et al. | 348/169 |
| 2002/0002629 A1 | 1/2002 | Fukushima | |
| 2005/0104864 A1 | 5/2005 | Zhang et al. | |
| 2006/0050982 A1* | 3/2006 | Grosvenor | 382/255 |
| 2007/0171273 A1 | 7/2007 | Saleh et al. | |
| 2011/0234746 A1 | 9/2011 | Saleh et al. | |
| 2013/0335508 A1* | 12/2013 | Mauchly | 348/14.08 |

FOREIGN PATENT DOCUMENTS

| | | |
|---|---|---|
| WO | 9637069 | 11/1996 |
| WO | 03081892 A2 | 10/2003 |

OTHER PUBLICATIONS

Smart Technologies, "Rear Projection SMART—3000i," copyright 2005, 2-pgs.

Smart Technologies, "Rear Projection SMART Board (TM) Interactive Whiteboard," copyright 2003, 1-pg.

Smart Technologies, "Rear Projection SMART Board (TM) Interactive Whiteboard," copyright 2003-2005, 3-pgs.

Smart Technologies, "Room Control Module for the 3000i," copyright 2004-2005, 1-pg.

Smart Technologies, "User's Guide: ConferencePilot(TM)," copyright 2004, 11-pgs.

Polycom, "iPower(TM) Product Line," Apr. 2003, 4-pgs.

Boeckeler Instruments, "Pointmaker(R) UTROL(R)-MT A/V Remote Control System," copyright 1994-2002, 2-pgs.

Boeckeler Instruments, "Pointmaker(R) PVI(TM)-83 Multiple-Sync Video Maker," copyright 1994-2004, 2-pgs.

Boeckeler Instruments, "Pointmaker(R) PVI(TM)-83 Multiple-Sync Video Maker with Keyboard: User's Manual," copyright 1995-2003, 168-pgs.

Polycom, Inc., "Setting up the Polycom(R) Instructor(TM) FS HDX Dual Display on the Media Cart," Instruction Manual, copyright 2009.

Polycom, Inc., "Setting up the Polycom Instructor RP: Version 1.0," Instruction Manual, copyright 2005.

Polycom, Inc., "Polycom(R) Conference Room Solutions," Brouchure, copyright 2005.

* cited by examiner

AUTOMATIC POSITIONING OF VIDEOCONFERENCE CAMERA TO PRESENTER AT PRESENTATION DEVICE

BACKGROUND

Users of a videoconferencing system can operate and control the system using a number of devices, including handheld remote controls, control panels, tablet input devices, keypads, or web interfaces to operate and control the system. With the handheld remote, the user aims the remote at the system and navigates through numerous selections and menus of a user interface. Tablet input devices and keyboards typically need to be appropriately connected to the videoconferencing system, and proper connection may be difficult for users. Moreover, users may also wish to set up a document camera, a computer with annotation tools, or other peripheral device for use during a videoconference. Unfortunately, these peripheral devices may be difficult to set up and use with the system.

One prior art videoconferencing system known in the art is the 3000iPower system available from Polycom, Inc. The 3000iPower system includes a Polycom iPower 9800 videoconferencing unit and a Rear Projection SMART Board™ 3000i interactive whiteboard from SMART Technologies, Inc. The iPower 9800 unit has a PC-based design so that it essentially operates as a computer and allows computer images to be projected and viewed within a videoconference call. In addition, a user can use a pen from a pen tray of the 3000iPower system and make notes on a whiteboard or highlight important information of displayed content. The 3000iPower system also offers touch screen controls that provide access to conference applications.

If the camera is pointing at participants and a videoconference and one of the participants wants to present at an electronic whiteboard, the camera is typically not configured to point properly at the presenter. To determine when the presenter is at the electronic whiteboard, current videoconferencing systems require the participant to change operations using a remote control or the like. Otherwise, a floor mat with a switch or an infrared sensor in the ceiling may automatically detect the presenter's presence at the electronic whiteboard so operations can be changed. As with other devices, these peripheral devices for switching operation and detecting the presence of a presenter may be difficult to set up and use with the videoconferencing system.

The subject matter of the present disclosure is directed to overcoming, or at least reducing the effects of, one or more of the problems set forth above.

SUMMARY

In a system and method of conducting a videoconference, a videoconferencing unit detects an activation related to a presentation device at a near-end of the videoconference. The unit stores a current orientation of one or more cameras of the system and directs at least one of the cameras at the presentation device. At this point, the unit begins outputting to a far-end the video captured of the presentation device with the directed camera and/or the content being displayed with the presentation device. The video and content can be sent as separate streams to the far-end as desired. At some point, the unit detects a deactivation related to the presentation device at the near-end and then redirects the one or more cameras to their stored orientations so the videoconference can proceed as before.

The disclosed system and method does not require any active selection from the user to change the system's operation to a presentation mode. In addition, the presenter does not need to switch or move cameras, nor does the presenter have to purchase any floor mats or proximity sensors to sense the location of the presenter. Instead, the system is intended to activate in the presentation mode automatically in response to an action taken by the presenter when preparing to present at the presentation device. In addition, the system does not require any additional hardware other than an existing codec of the videoconferencing unit to show whiteboard or annotated content during a videoconference.

The foregoing summary is not intended to summarize each potential embodiment or every aspect of the present disclosure.

BRIEF DESCRIPTION OF THE DRAWINGS

FIGS. 7B-1 and 7B-2 illustrate four ways the two streams can be displayed at the far-end endpoint.

DETAILED DESCRIPTION

Figure 1A:
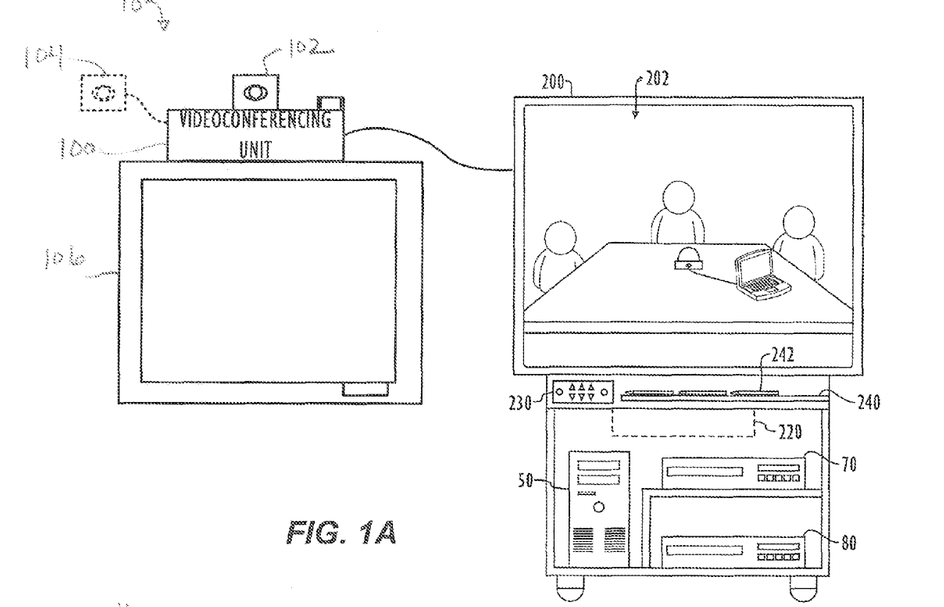
FIGS. 1A-1B illustrate videoconferencing systems according to the present disclosure.
Figure 1B:
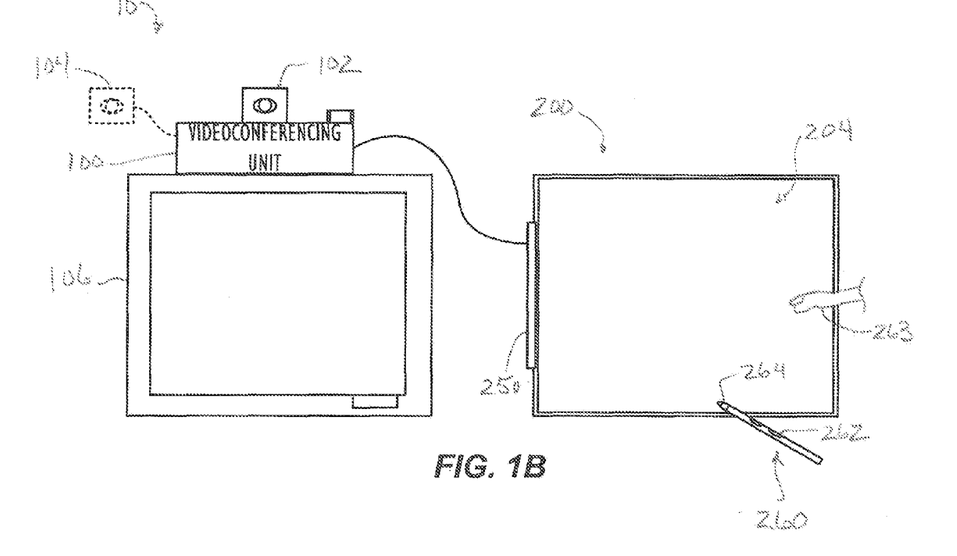

FIGS. 1A-1B illustrate some videoconferencing systems 10 according to the present disclosure. The systems 10 include a videoconferencing unit 100, a main camera 102, an optional auxiliary camera 104, a display 106, and a presentation device 200. Among other common capabilities, the videoconferencing systems 10 can place and receive video calls and can share content as is customary in a videoconference. The display 106 can be any conventional display for showing video for the conference, providing user interfaces, and utilizing other common features.

For its part, the presentation device 200 allows presenters to annotate content or make notations on a whiteboard during the videoconference. In general, the presentation device 200 can be a touch screen panel, an electronic whiteboard, a projector screen, a plain whiteboard, etc. In some implementations, especially for a touch screen panel or electronic whiteboard, the presentation device 200 can allow a presenter to control aspects of the system's operation.

As shown in FIG. 1A, the main camera 102 can be mounted on (or integrated into) the videoconferencing unit 100. In turn, the unit 100 can be mounted on (or generally associated) with the display 106 for showing video from one or more far-end endpoints. If the auxiliary camera 104 is used, it can be mounted elsewhere in the videoconferencing environment. The system 10 can also have various peripherals or content sources, such as a computer 50 (either laptop or desktop), a Video Cassette Recorder (VCR) 70, a Digital Versatile Disc (DVD) player 80, etc.

The presentation device 200 shown in FIG. 1A is an integrated device having a touch screen panel 202, a projector 220, a control panel 230, a tray 240, and a stylus 242. In general, the presentation device 200 can have touch sensors (not shown) integrated into the panel 202, and the sensors can be based on visual or other form of sensing. However, it will be appreciated that various types of displays, sensors, projectors, and the like can be used.

In one implementation, the videoconferencing system 10 of FIG. 1A is similar to a Polycom Instructor RP system having a VSX 8000 videoconferencing unit available from Polycom, Inc. and having a 3000i model SMART Board available from SMART Technologies of Canada. In an alternative implementation, the videoconferencing unit 100 and the presentation device 200 can be integrated together for the videoconferencing system 10. In yet another implementation, the videoconferencing system 10 can be similar to a Polycom Instructor FS HDX system having a Polycom HDX 9002 videoconferencing unit and a SMART Board interactive touch screen display.

As shown in the other example of FIG. 1B, the videoconferencing unit 100 can have main camera 102 mounted on (or integrated into) it as before, and the unit 100 can be mounted on (or generally associated) with the display 106 for showing video from one or more far-end endpoints. If the auxiliary camera 104 is used, it can also be mounted elsewhere in the videoconferencing environment.

In contrast to the previous arrangement of FIG. 1A, the presentation device 200 in FIG. 1B is a visual component 204 having a separate sensor device 250 attached to it. For example, the visual component 204 can be a conventional flat screen display, an ordinary dry erase board, a projector screen, or other common visual component. The sensor device 250 attaches to the component 204 as a peripheral and senses annotations made by a presenter using a stylus 260, pen, or even the presenter's finger 263.

For example, the sensor device 250 can use infrared, ultrasound, and/or optics to triangulate the position of the stylus 260, pen, or finger 263 relative to the component 204 on which the sensor device 250 is attached. In turn, the sensor device 250 couples to the videoconferencing unit 100 via an interface, such as USB, and the unit 100 with its internal codec (not shown) determines the annotations made by the presenter.

The annotations can be displayed on the component 204, directly if the component 204 is a flat panel display, or they can be projected on the component 204, indirectly by a projector or the like if the component 204 is a conventional dry erase board or a projector screen. For its part, the stylus 260 can be an active device having control buttons 262 for performing various functions, and the tip 264 of the stylus 260 can be depressed during use to indicate use of the stylus 260 as a pen for annotations or user selections. All the same, the presenter's finger 263 or some other object could be used for annotations as already mentioned.

Figure 2:
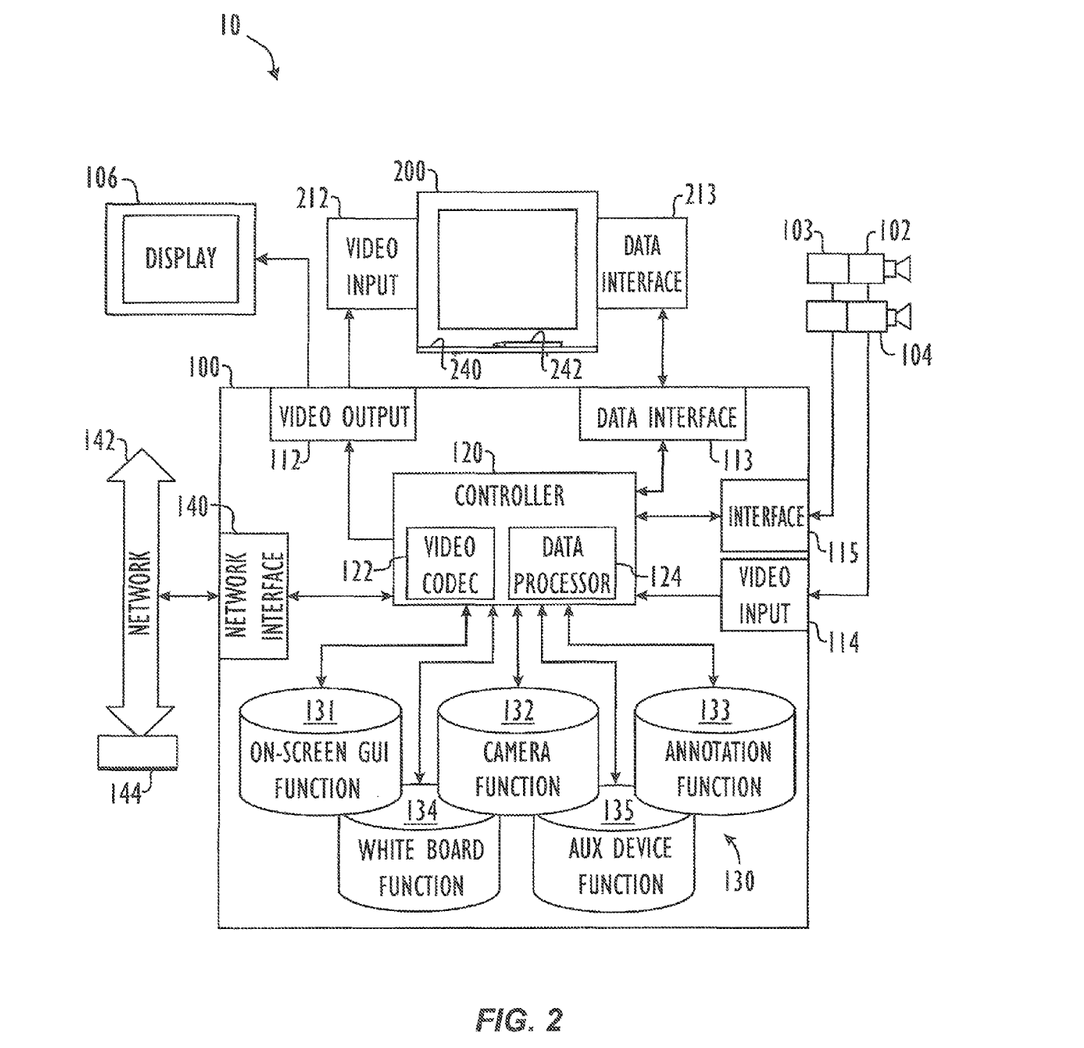
FIG. 2 schematically illustrates a videoconferencing system according to the present disclosure.

With a general understanding of the system 10, FIG. 2 schematically illustrates the videoconferencing system 10 according to the present disclosure in more detail. As before, the system 10 includes the videoconferencing unit 100, the main camera 102, the optional auxiliary camera 104, the display 106, and the presentation device 200. The videoconferencing system 10 can further include one or more peripheral devices described previously, but not shown here.

The videoconferencing unit 100 is used to establish and conduct the videoconference with far-end endpoints 144 via a network 142. The presentation device 200 in this example is capable of both displaying video to participants and receiving touch and annotations from participants. Accordingly, the device 200 can having a video screen 202 with sensors for detecting when a user touches or writes on an area of the screen 202.

In one arrangement, the videoconferencing unit 100 of the system 10 is coupled directly to the presentation device 200. In another arrangement, an NV controller (not shown) can be used between the unit 100 and the device 200. For example, the A/V controller can be a POINTMAKER® PVI video marker, which is a programmable device that is used to control audio and visual devices and is available from Boeckeler Instruments, Inc. of Tucson, Ariz.

With respect to video connections of the system 10, the one or more cameras 102/104 couple to video input(s) 114, such as S-video or HDMI connections, of the unit 100. In turn, the unit 100 has a video outputs 112 that couple to a video input 212 of the presentation device 200 and couple to a video display 106 (if provided). For example, an XGA cable can be used to connect XGA outputs of the unit 100 to RGB inputs of the display 106 and device 200.

The videoconferencing unit 100 also has a data interface 113 that couples to a data interface 213 of the presentation device 200, and the unit 100 and the presentation device 200 can transfer data between one another using the data interfaces 113 and 213. This data includes touch data obtained by the presentation device 200 and transferred to the unit 100, which uses the touch data for operation as discussed below. The transferred data can also include data generated by a user selecting a configured button on a control panel (not shown) of the device 200.

Being the central unit of the system 10, the videoconferencing unit 100 has a controller 120, which can include any conventional encoders, processors, and other electronic components known in the art and used for videoconferencing. The controller 120 couples to the video outputs 112 for the display and presentation device 106 and 200 and couples to the data interfaces 113 and 115 for exchanging data with the presentation device 200 and the cameras 102 and 104.

Inside the unit 100, the controller 120 includes a video codec 122 and a data processor 124, and the controller 120 couples to memory 130 storing functions 131-135 and couples to a network interface 140, such as commonly used for videoconferencing. In turn, the network interface 140 couples to a network 142 known in the art, which connects to far-end endpoints 144.

The video codec 122 processes video data to be displayed by the display device 106 (and the presentation device 200 if applicable) and processes video data to be sent to remote endpoints 144 of the videoconference. In general, the video data can include images captured by the cameras 102/104 of the unit 100, video from the remote endpoints 144, content from a peripheral device (e.g., VCR, DVD player, computer, document camera, etc.), annotations from the presentation device 200, and other visual data. Operation of such a video codec 122 in the context of videoconferencing is well known in the art and is not described here in detail. The data processor 124 processes data for the videoconferencing unit 100, such as any touch data from the presentation device 200 and any communication data, commands, videoconference information, etc.

The controller 120 controls operation of at least some features of the videoconferencing system 10 using the operational functions 131-135 stored in memory 130. These operational functions include, but may not be limited to, an on-screen graphical user interface (GUI) function 131, a camera function 132, an annotation function 133, a whiteboard function 134, and an auxiliary device function 135.

Briefly, the various functions 131-135 operate as follows. The on-screen GUI function 131 allows the videoconferencing unit 100 to display graphical user interfaces for controlling operation of the system 10 on the display 106 and/or presentation device 200. For example, the graphical user interfaces can use a number of touch controls, menus, and dialogs that can be displayed on the presentation device 200 for a user to operate and control the system 10. The graphical user interfaces of the unit 100 can allow the user to place a videoconference call through a directory, speed dial, or manual dial menu; answer an incoming videoconference call; hang-up a videoconference call; mute or change volume of audio; select camera and content sources; swap near and far video in picture-in-picture (PIP); and perform other operations disclosed herein.

The camera function 132 allows the unit 100 to control operation of the cameras 102/104, which can be pan-tilt-zoom cameras. The auxiliary device function 135 allows the unit 100 to display content from other auxiliary devices, such as a computer, laptop, VCR player, DVD player, etc. Finally, the annotation function 133 allows a presenter to make annotations on video displayed on the presentation device 200, and the whiteboard function 134 allows the user to make annotations on an electronic whiteboard displayed on the presentation device 200.

As hinted to previously, the videoconferencing system 10 can be operated in a presentation mode so a presenter can use the presentation device 200 and have video captured by one of the cameras 102/104. Once in the presentation mode, the videoconferencing unit 100 receives touch data from the presentation device 200 and combines the received touch data as annotation to the displayed content. The videoconferencing unit 100 then sends this annotated content to the presentation device 200 for display and sends annotated content to the endpoints (not shown) of the videoconference via the unit's network interface (140; FIG. 2). Thus, annotations can be made to content and sent automatically to far-end endpoints via the network 142.

Sending the annotated content preferably involves combining the annotation data and content data together so that the combination can be sent in any known standard through the network (e.g., H.239, scalable video coding (SVC), WebSocket protocol, etc.). If desired, a separate computer (as opposed to the unit 100) can handle annotations and content for display on the presentation device 200. This can avoid issues with delay that may occur when a user makes annotations during a videoconference because the videoconferencing unit 100 may use a feedback arrangement to process and display annotations. Preferably, however, the electronic annotation and whiteboard functions 133 and 134 can be integrated into the unit's codec 122.

Figure 3A:
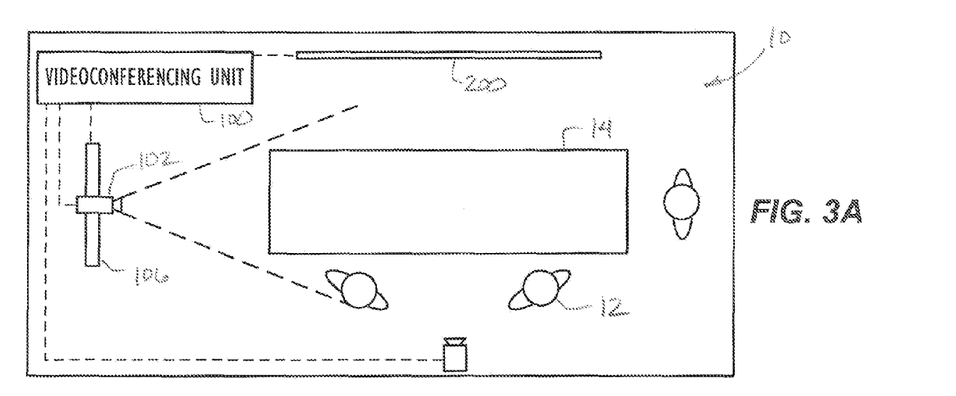
FIG. 3A illustrates a plan view of a videoconferencing system during a normal mode of operation.
Figure 3B:
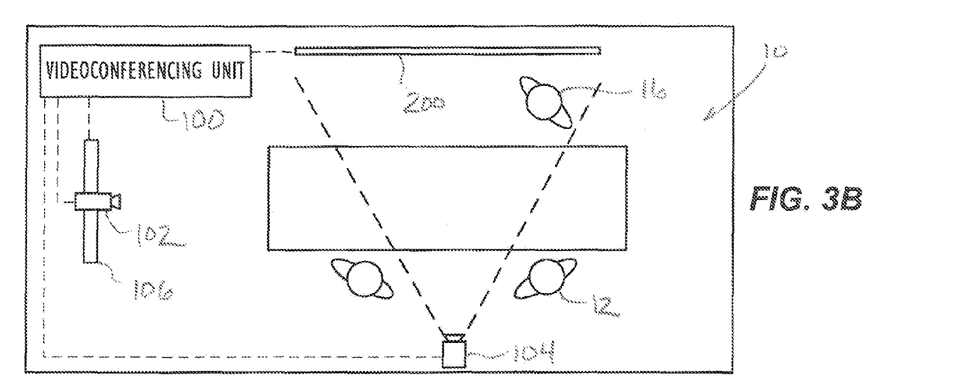
FIG. 3B illustrates a plan view of a videoconferencing system during a presentation mode of operation.
Figure 3C:
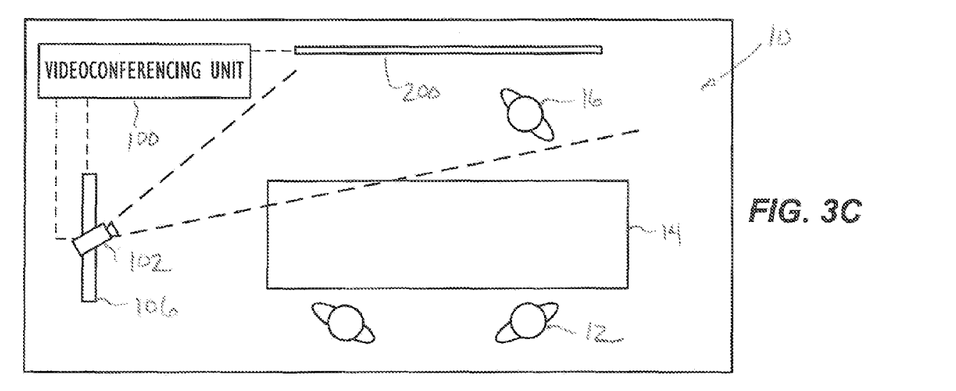
FIG. 3C illustrates a plan view of a different arrangement of videoconferencing system during a presentation mode of operation.
Figure 4A:
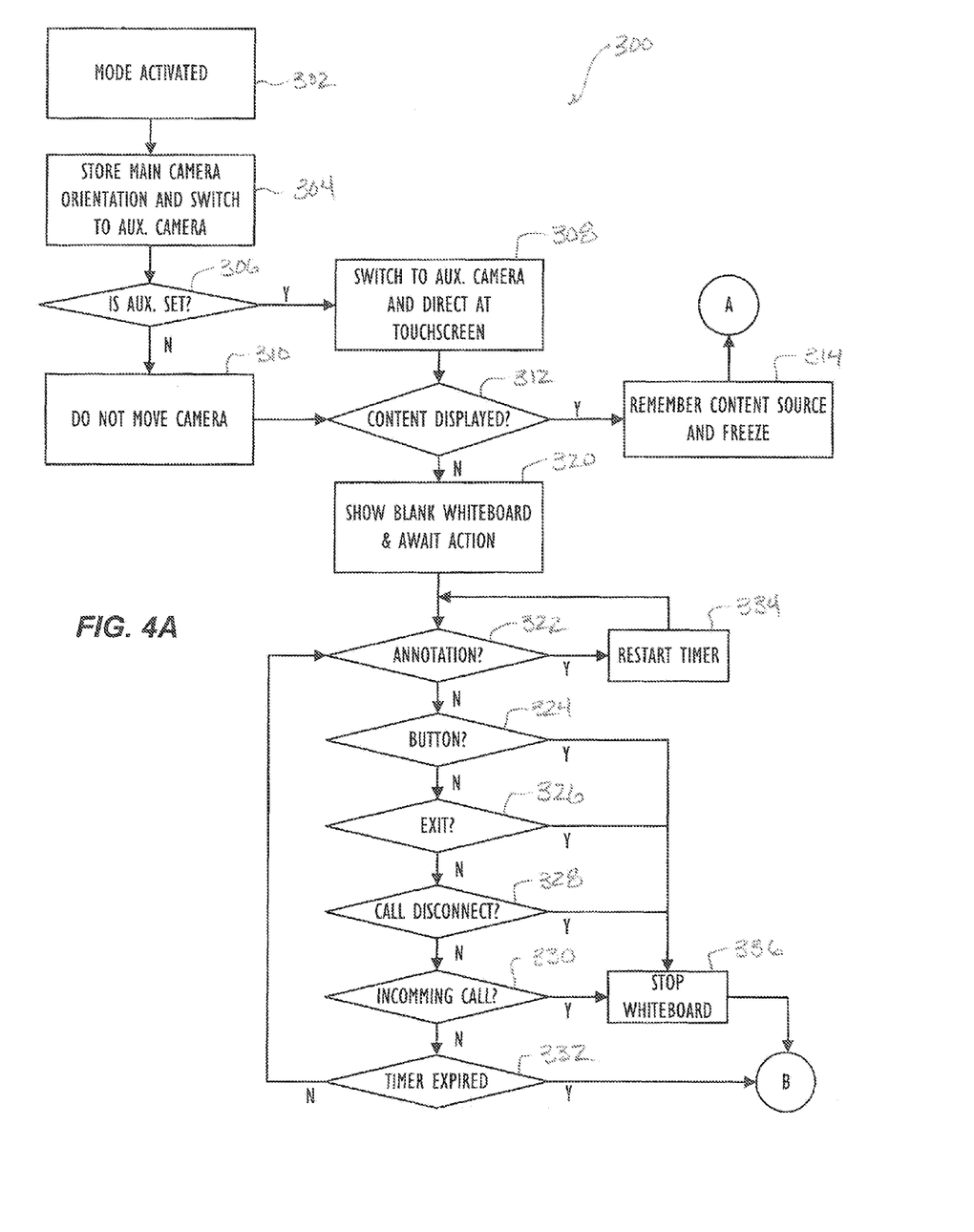
FIGS. 4A-4B illustrate operation of the videoconferencing system in flow chart form.
Figure 4B:
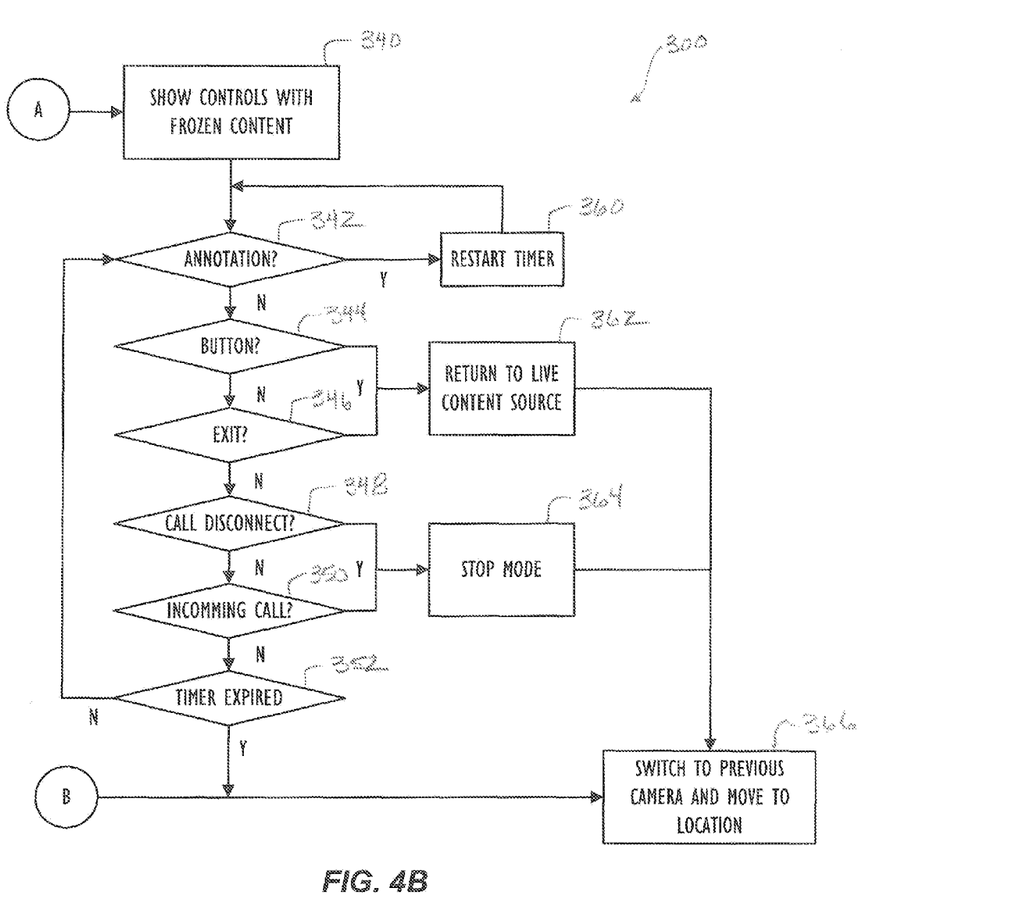

With an understanding of the videoconferencing system 10, videoconferencing unit 100, and other components, discussion now turns to the operation of the system 10 with reference to FIGS. 3A-3C and 4A-4B. In FIGS. 3A-3C, the plan views show participants 12 seated around a conference table 14 in an example videoconferencing environment. The system 10 shown in FIGS. 3A-3C has the videoconferencing unit 100, one or more cameras 102 and 104, and the presentation device 200. As will be appreciated, the environment can have any of a number of configurations, and the ones depicted here are only meant to be illustrative. In FIGS. 4A-4C, a process 300 for operating the videoconferencing system 10 is shown in flowchart form.

During operation, the participants 12 (as shown in FIG. 3A) may be seated at the conference table 14, and the videoconferencing unit 100 obtains conference video with the main camera 102. The unit 100 then sends captured video of the conference participants 12 to the far-end (not shown). In FIGS. 3A-3B, the system 10 has two cameras 102 and 104, while the system 10 in FIG. 3C has one camera 102. As will be appreciated, any number of cameras can be used for the system 10.

At some point, one of the conference participants 12 may wish to use the presentation device 200 to make some annotations or refer to content for the videoconference. As shown in FIGS. 3B-3C, for example, a presenter 16 has now moved to the presentation device 200. Standing near the device 200, however, the presenter 12 may not be properly captured by the main camera 102, which is typically arranged to view participants 12 when at the table 14.

To handle this situation, the system 10 relies on an activation to occur so the system 10 can enter a presentation mode of operation so the presenter 16 can make annotations to displayed content or an electronic whiteboard. In the presentation mode, the system 10 determines which camera 102/104 or which view of the cameras 102/104 to use for videoconference output.

As soon as the presenter 16 activates the presentation mode of operation, for example, the unit 100 switches from the main camera 102 to the auxiliary camera 104 for the multiple camera system 10 of FIG. 3B. In this way, the auxiliary camera 104 can more readily view the presenter 16 at the presentation device 200. For the single camera system 10 of FIG. 3C, the unit 100 can instead move the main camera 102 from a room view to a tightened view of the presenter 16 at the presentation device 200.

Activation of the presentation mode of operation can be performed in a number of ways. For example, the system 10 can use conventional features such as a command from a remote control, a sensor mat near the device 200, or an infrared ceiling mounted sensor over the device 200 to switch automatically to the presentation mode of operation. Alternatively, an electronic stylus (260; FIG. 1B) or pen for use with the presentation device 200 may have one or more activation buttons that can trigger the presentation mode of operation. All the same, even the user's finger 263 can be used with the presentation device 200.

Moreover, the presenter 16 can simply touch the screen of the presentation device 200 with an electronic stylus (i.e., stylus 260 of FIG. 1B with touch sensitive tip), can touch the device's screen with a finger, can move an electronic stylus (242; FIG. 1) from a tray (240) on the device 200, can press a button on the device's control panel (230; FIG. 1A), or can perform some other user-initiated action with respect to the device 200 to initiate the presentation mode of operation.

When the presentation mode for the device 200 is activated (Block 302; FIG. 4A), the videoconferencing unit 100 selects the optional auxiliary camera 104 to capture video for the multiple camera system 10 of FIG. 3B. Alternatively, for the single camera system 10 of FIG. 3C, the system 10 automatically moves the main camera 102 to direct it in the vicinity of the device 200. Moving the main camera 102 to direct at the device 200 and presenter 16 can involve any of the known techniques for controlling the pan, tilt, and zoom of a camera based on stored coordinates, remote infrared or acoustic signals between the device 200 (or presenter 16)

and microphones (not shown) of the unit 100, and other techniques. At this point, the unit 100 then sends captured video of the presentation device 200 and presenter 16 to the far-end endpoints (not shown).

In particular, upon activation of the presentation mode, the unit 100 preferably saves a current orientation of the main camera 102 and switches to the auxiliary camera 104 (or redirects the main camera 102) (Block 304). This stored orientation can include the pan, tilt, and zoom of the camera 102 and 104 and can be used later when exiting out of the presentation mode of operation so the system 10 can readily revert back to the previous operational mode used during the videoconference before switching to the presentation mode.

During any point in the videoconference, the auxiliary camera 104 may have been redirected to capture video of other parts of the room besides the presentation device 200. For example, the auxiliary camera 104 may capture the face of a participant 12 opposite to it when that participant 12 is speaking during the conference. Therefore, the unit 100 determines if the auxiliary camera 104 is properly set to capture video of the presentation device 200 and presenter 16 (Decision 306). If so, then the camera 104 is not moved (Block 310). Otherwise, the unit 100 directs the auxiliary camera 104 at the presentation device 200 using techniques known in the art. Again, moving the auxiliary camera 104 to direct at the device 200 and presenter 16 can involve any of the known techniques for controlling the pan, tilt, and zoom of a camera based on stored coordinates, remote infrared or acoustic signals between the device 200 (or presenter 16) and microphones of the unit 100, and the like.

After the auxiliary camera 104 (or the main camera 102) are set to show the presenter 16 at the presentation device 200, the unit 100 determines if content is currently being displayed on the device 200 (Decision 312). For example, the unit 100 may be displaying a slide show, a picture, a document, a video, or any other type of content on the device 200 for viewing. As noted previously, the unit's codec (122; FIG. 2) may be responsible for displaying this content on the device 200. As an alternative to determining if content is currently displayed, the system 10 may actively begin displaying content from a designated content source once the activation is detected.

If content is being displayed, the unit 100 remembers the content source (i.e., computer, VCR, etc.) currently used and freezes the content's image being displayed (Block 314). At the same time, the particular content displayed on the presentation device 200 is sent to the far end (not shown) as a separate video stream. In this way, video of the presenter 16 at the presentation device 200 and/or video of the device's content can be displayed together or separately at the far end depending on the desired implementation. (Further processing (A) with respect to content being displayed is discussed later with reference to FIG. 4B.)

If no content is being displayed (Decision 312), the videoconferencing unit 100 enters a whiteboard mode of operation. In this mode, the unit 100 shows a blank whiteboard on the device 200 and awaits a particular action (Block 320). The particular action can include, and is not necessarily limited to, starting of an annotation on the presentation device 200, pressing of a button on the presentation device 200, exiting of the whiteboard function, disconnecting from a call, and receiving an incoming call (Decisions 322-332). These and other actions could be used.

A timer controls the period of time in which the blank whiteboard is displayed and actions are awaited. For example, as long as annotations to the whiteboard are being detected (Yes at Decision 322), the timer is restarted so the presenter 16 can continue to present at the device 200 and intermittently annotate the whiteboard (Block 334). At some point, processing proceeds to further operations (B) because the user exits the whiteboard mode (Block 324), the unit 100 stops the whiteboard function (Blocks 336), the timer expires (Block 332), or the system 10 undergoes some deactivating event.

The description above focused on the presentation device 200 showing a blank whiteboard. As shown in FIG. 4B, the unit 100 can also operate when other content is being displayed on the presentation device 200. As noted previously, once the unit 100 determines that content is being displayed on the device 200, the unit 100 freezes the display of content on the device 200 (Block 314; FIG. 4A). At this point, the unit 100 can show various controls for operating the system 100 and can show the controls overlaid on the frozen content (Block 340; FIG. 4B). (FIG. 5 below shows an example of some overlaid controls displayed on the device 200.)

As with the whiteboard mode of FIG. 4A, the unit 100 in this annotation mode of FIG. 4B also awaits one of the various actions to occur as described previously and can control the waiting period with a timer (Decisions 342-352). When the presenter makes annotations (Yes at Decision 342), for example, the unit 100 restarts the timer (Block 360). All the while, the various annotations are added to the display of the frozen content on the device 200 and can be sent along with the content in a separate stream to the far end.

If the presenter 16 presses a button on the device 200 or exits the annotation function, then the unit 100 can return to showing the content from the content source in real time (Block 362). If the call disconnects or if an incoming call is received, then the unit 100 can stop the annotation function (Block 364). The same is the case if the active timer expires (Decision 352).

When the presenter 16 stops using the presentation device 200 (e.g., the presenter 16 turns off the whiteboard/annotation functions or the unit 100 times out after a certain amount of time), the unit 100 selects the main camera 102 so video of the participants 12 around the table 14 can now be sent to the far end. In particular, the unit 100 switches to the main camera 102 and directs it at its previously stored orientation (if it has been moved) to obtain video of the participants 12 at the table 14. The unit 100 now sends video obtained with the main camera 102, while the separate video stream of the device's content stops. In addition to the stored orientation, the system 10 can revert to other stored parameters of the previous operational mode, such as content source displayed on the device 200, audio features, and the like.

As discussed above, the presenter 16 may actively terminate the whiteboard/annotation function, a call may disconnect, or a call may be received so the unit 100 terminates the device's inclusion in the videoconference. Yet, the presenter 16 may alternatively return to the conference table 14 without actively stopping the presentation session. If this occurs, the unit 100 selects the main camera 102 to capture conference video, but the unit 100 can continue to send the content of the device 200 to the far-end as a separate stream. After a predetermined time without any activity on the device 200 (from writing or annotation), the separate stream of the whiteboard/annotated content can be stopped. The time allotted for this delayed termination can be selected so the presenter 16 can stop writing on the device 200 and return to the table 14, while still having time to discuss the content being displayed.

Figure 5:
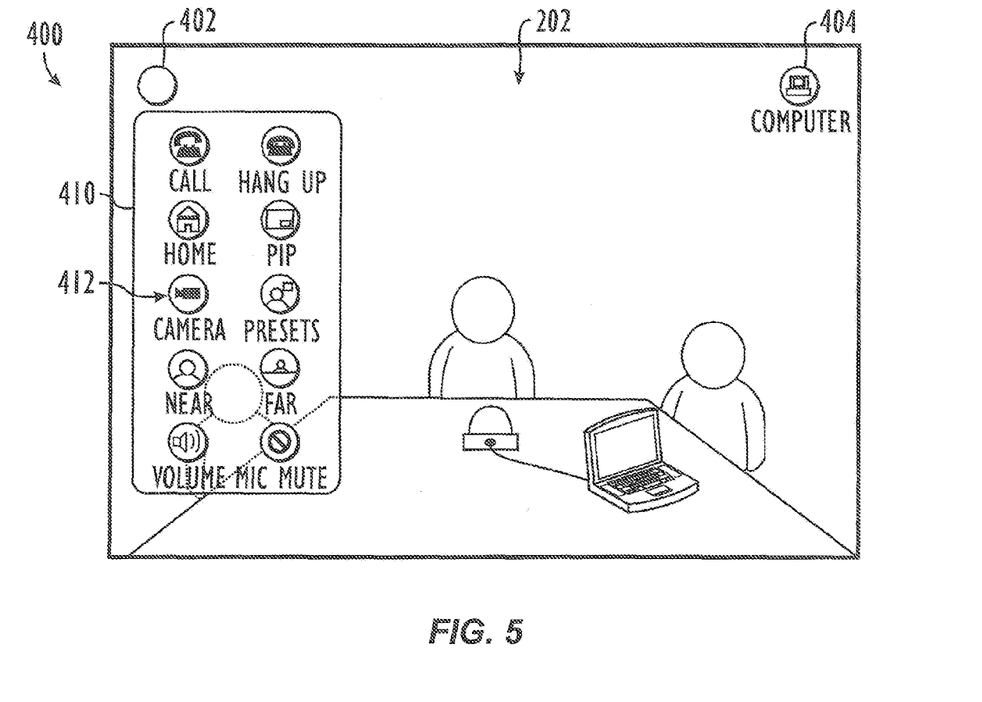
FIG. 5 illustrates a menu function of the videoconferencing system displayed on the presentation device.

As noted previously, the unit 100 can display controls on the presentation device 200 for the presenter 16 to control operation of the system 10 when at the device 200. As one brief example, FIG. 5 shows a menu 310 that can be generated by the videoconferencing unit (100) and shown on the touch screen 202 of the device (200). The menu 310 can be invoked automatically as noted above or when the presenter makes an active selection with a button or the like. Once invoked, the menu 310 allows the presenter 16 to control the videoconferencing system 10 by using interactive touch directly on the screen 202.

The menu 310 includes a plurality of touch controls 312 similar to buttons available on a remote control, such as a Home button, a Call button, a Hang-Up button, a Volume button, a Mute button, a Cameras button, a picture-in-picture (PIP) button, a Near button, a Far button, a Preset button, and a Close button. These and other controls may be provided in the menu 310 depending on the implementation, and the whiteboard mode described previously can also display a menu.

Figure 6A:
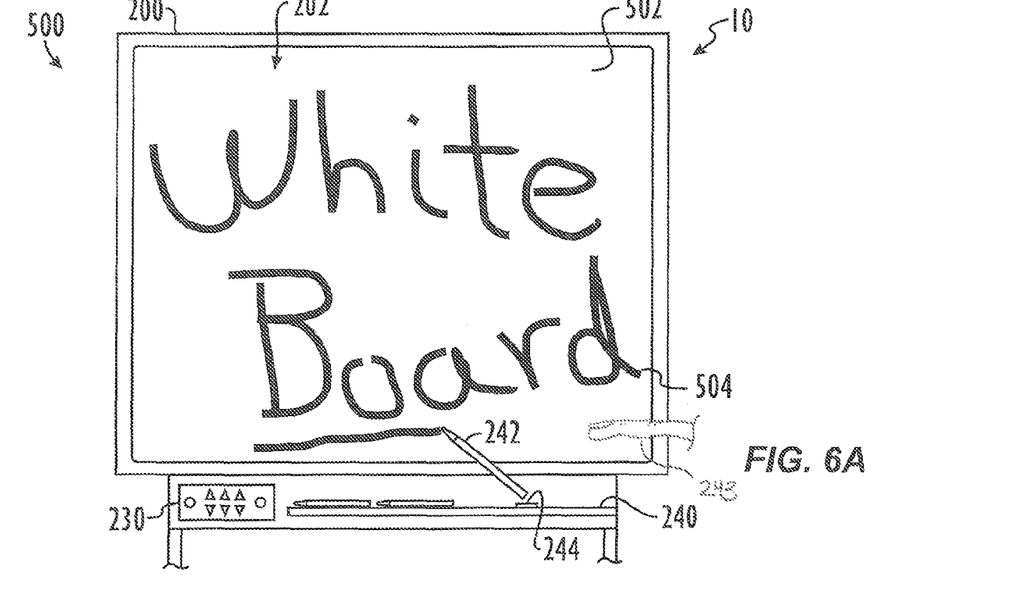
FIG. 6A illustrates a whiteboard function of the videoconferencing system displayed on the presentation device.

As discussed previously, the videoconferencing unit 100 of FIG. 2 has the whiteboard function 134 for adding annotations to an electronic whiteboard displayed on the presentation device 200. Referring to FIG. 6A, an example of a presentation device 200 is shown operating in a whiteboard mode 500 as one of the presentation modes of operation.

Before going into detail of the whiteboard mode 500, discussion first focuses on details of the presentation device 200. As noted previously, the device 200 can be a 3000i model SMART Board, a visual component (e.g., flat screen display) with a sensor device, or similar arrangement. As shown in FIG. 6A, the device 200 can include a screen 202, an integrated Extended Graphics Array (XGA) projector (not shown), a control panel 230, and a tray 240. To detect when a user touches the screen 202, the device 200 uses digital cameras (not shown) or other sensors to detect objects and movement relative to the display screen 202. The control panel 230 of the display device 200 includes buttons configured to operate in conjunction with the videoconferencing unit 100. Finally, the tray 240 has various tools 242, such as styluses and erasers. Optical or other sensors (not shown) on the tray 240 are used to detect when a user picks up a certain stylus 242, eraser, or other tool from the tray 240.

Now discussing the whiteboard mode 500, the presenter (16) can make annotations 504 over electronic whiteboard video currently displayed on the device's screen 202. The annotations 504 can be made with the electronic stylus 242 or finger 243. As noted previously, the videoconferencing system 10 can automatically go into this whiteboard mode 500 of operation as soon as the presenter (16) picks up the electronic stylus 242 from the tray 240. To achieve this automation, the sensors 244 on the tray 240 of the device 200 can be used. The detection can then be sent from the presentation device 200 through the data interface (113/213) to the videoconferencing unit (100) as discussed previously.

Figure 6B:
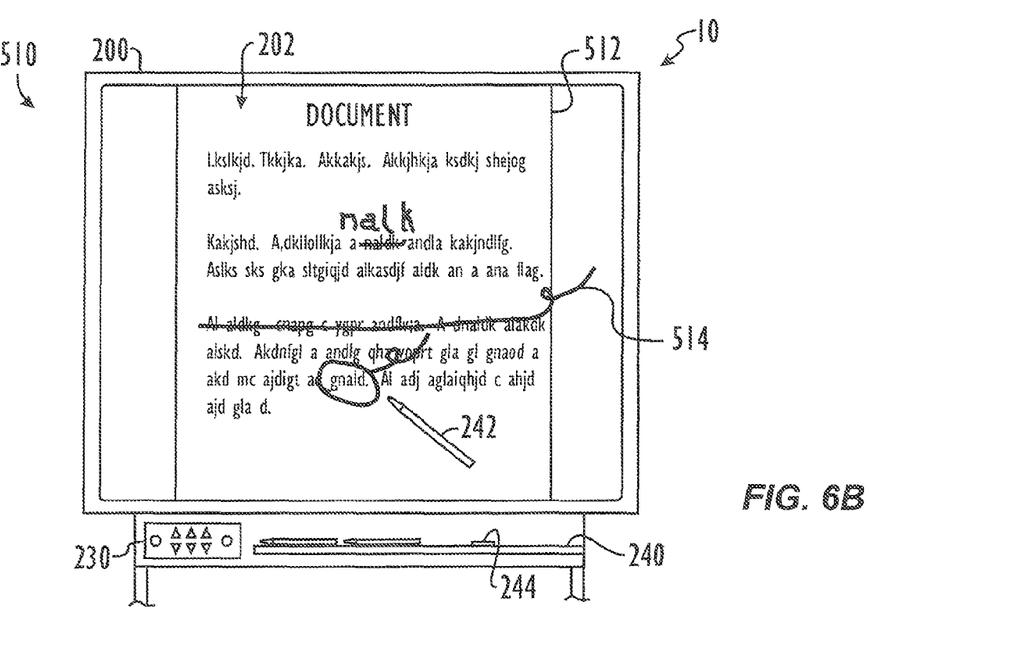
FIG. 6B illustrates an annotation function of the videoconferencing system displayed on the presentation device.

In addition to the whiteboard function 134, the videoconferencing unit 100 of FIG. 2 has the annotation function 133 for adding annotations to displayed video. Referring to FIG. 6B, the presentation device 200 having the visual component 204 and mounted sensor device 250 is shown operating in an annotation mode 510 as one of the presentation modes of operation. In this mode 510, the presenter (16) can make annotations 512 over a video image currently displayed on the screen 202. As before, the annotations 512 can be made with an electronic stylus 260 or finger so the presenter (16) can annotate on a displayed image or content 512 on the screen 202. The displayed content 512 can be a displayed document from a connected document camera or a computer, videoconference video from the videoconferencing unit 100, video from a document camera, video from a VCR or DVD player, or a computer screen image from a connected computer.

When annotations 504/514 are made on the device 200 in either mode 500/510 of FIGS. 6A-6B, the graphical elements of the annotations 504/514 are combined with the displayed content (i.e., whiteboard or image). By combining the annotations 504/514 with the displayed content, the annotations 504/514 can be readily sent to the far end (not shown) of the videoconference as part of the compressed video stream sent from the videoconferencing unit (100) to remote endpoints over the videoconference network.

Figure 7A:
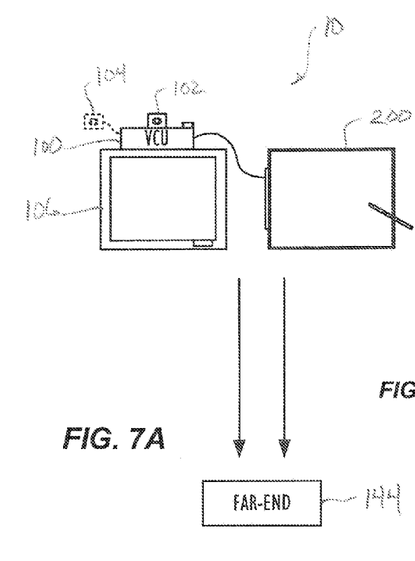
FIG. 7A illustrates the disclosed videoconferencing system sending two streams to a far-end endpoint during a presentation mode of operation.

As hinted to above and now shown in FIG. 7A, the disclosed videoconferencing system 10 can send one or more video streams to a far-end endpoint during a presentation mode of operation. In particular, the videoconferencing unit 10 can send first video captured by the auxiliary camera 104 (or the main camera 102) to the far-end endpoint 144. (More or less streams may be sent from the unit 10, and if the conferencing environment has multiple presentation devices 200, the multiple streams may be sent. Two streams are shown in FIG. 7A for simplicity.) This captured video can be of the presenter (16) at the presentation device 200 while pointing out details or making annotations to the device's screen 202. At the same time, the unit 100 can send presented content of the presentation device 200 to the far-end endpoint. This presented content can include the whiteboard, video, or other images with annotations made by the presenter at the device's display.

Figure 7B:
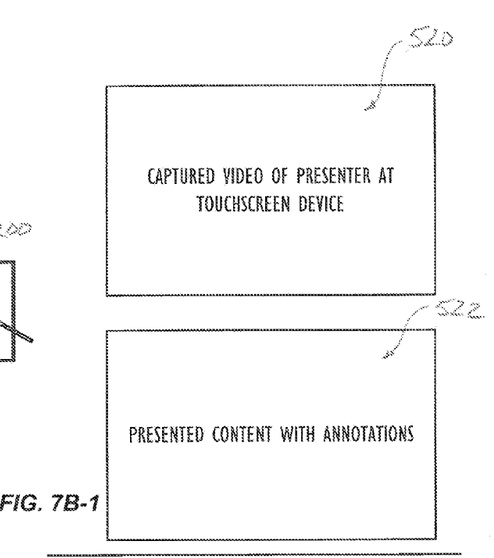
Figure 7B:
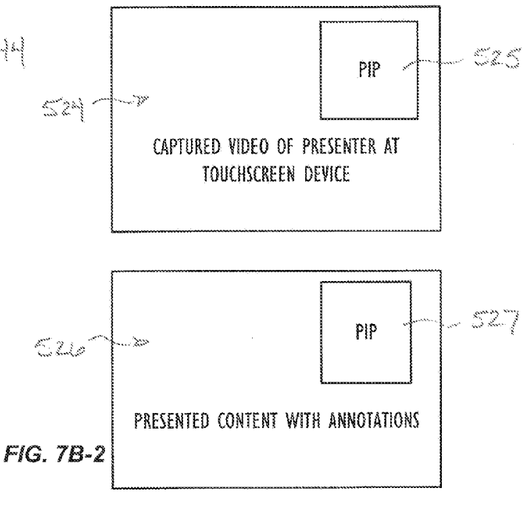

The two streams can be displayed in a number of ways at the far-end endpoint 144. For example, FIGS. 7B-1 and 7B-2 illustrates four ways the two streams can be displayed at the far-end. As shown in FIG. 7B-1, the far-end endpoint (144) can display captured video 520 of the presenter at the presentation device 200. Separately, the far end can display presented content 522 with annotations as shown in FIG. 7B-1. If the far-end endpoint is a comparable videoconferencing system including both a conventional display 206 and a presentation device 200, these two forms of display 520 and 522 in FIG. 7B-1 can be shown at the same time at the far-end on the separate devices. Should the far-end endpoint only have a single display (which may or may not include touch screen features), then the far-end endpoint can display one or the other of these forms of display 520 and 522 in FIG. 7B-1 and can be switched therebetween.

Additionally, as shown in FIG. 7B-2, captured video 524 can be displayed on a screen at the far-end with the presented content displayed as a picture-in-picture 525. As also shown in FIG. 7B-2, the reverse arrangement can also be used with the captured video 527 as the picture-in-picture and the presented content 526 as the main display at the far end. These last two forms of display in FIG. 7B-2 may be most useful when the far-end endpoint has only one display for displaying video of the presenter and video of the content from the near-end videoconferencing system 10.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable or programmable storage device for execution by a programmable processor or control device so that the programmable processor or control device executing program instructions can perform functions of the present disclosure. The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of conducting a videoconference, comprising:
    detecting an activation related to a presentation device at a near-end of the videoconference;
    monitoring, in response to the activation, activity on the presentation device with a timer;
    storing a current orientation of at least one camera at the near-end;
    directing the at least one camera at the presentation device at the near-end;
    outputting to a far-end at a same time both (i) a first stream of video captured of the presentation device with the at least one directed camera and (ii) a second stream of content displayed with the presentation device separate from the video of the contents captured with the at least one directed camera;
    detecting a deactivation related to the presentation device at the near-end by timing out of the timer without monitored activity; and
    redirecting the at least one camera to the stored orientation at the near-end.

2. The method of claim 1, wherein detecting the activation comprises detecting a signal from a remote control, a pressure sensitive mat, or an infrared sensor.

3. The method of claim 1, wherein detecting the activation comprises detecting a signal from a sensor associated with the presentation device.

4. The method of claim 3, wherein detecting the signal from the sensor comprises detecting a sensor signal in response to a stylus moved from a tray on the presentation device, an object coming into proximity of a screen of the presentation device, a finger coming into proximity of the screen of the presentation device, or a button being depressed on the presentation device.

5. The method of claim 1, wherein the at least one camera comprises first and second cameras; and wherein storing the current orientation of the at least one camera comprises storing the current orientation of the first and second cameras.

6. The method of claim 1, wherein directing the at least one camera at the presentation device at the near-end comprises moving the at least one camera from its current orientation to a new orientation directed at the presentation device.

7. The method of claim 1, wherein the at least one camera comprises first and second cameras; and wherein directing the at least one camera at the presentation device at the near-end comprises switching from the first camera directed at the current orientation to the second camera directed at the presentation device.

8. The method of claim 1, wherein detecting the deactivation comprises overriding the timer by receiving an exit instruction, receiving an incoming call, or disconnecting from an existing call.

9. The method of claim 1, wherein redirecting the at least one camera to the stored orientation at the near-end comprises moving the at least one camera from its current orientation to the stored orientation.

10. The method of claim 1,
    wherein the at least one camera comprises first and second cameras;
    wherein directing the at least one camera at the presentation device at the near-end comprises switching from the first camera directed at the current orientation to the second camera directed at the presentation device; and
    wherein redirecting the at least one camera to the stored orientation at the near-end comprises switching from the second camera directed at the presentation device back to the first camera associated with the stored orientation.

11. A programmable storage device having program instructions stored thereon for causing a programmable control device to perform a method of conducting a videoconference, comprising:
    detecting an activation related to a presentation device at a near-end of the videoconference;
    monitoring, in response to the activation, activity on the presentation device with a timer;
    storing a current orientation of at least one camera at the near-end;
    directing the at least one camera at the presentation device at the near-end;
    outputting to a far-end at a same time both (i) a first stream of video captured of the presentation device with the at least one directed camera and (ii) a second stream of content displayed with the presentation device separate from the video of the content captured with the at least one directed camera;
    detecting a deactivation related to the presentation device at the near-end by timing out of the timer without monitored activity; and
    redirecting the at least one camera to the stored orientation at the near-end.

12. A videoconferencing system, comprising:
    a visual component;
    a sensor associated with the visual component and obtaining touch data relative to the visual component; and
    a videoconferencing unit operatively coupled to a videoconference network, at least one camera, and at least one of (i) the visual component and (ii) the sensor, the videoconferencing unit configured to:

detect an activation related to the at least one of (i) the visual component and (ii) the sensor;
monitor, in response to the activation, activity on the at least one of (i) the visual component and (ii) the sensor with a timer;
store a current orientation of the at least one camera;
direct the at least one camera at the visual component;
output to a far-end at a same time both (i) a first stream of video captured of the visual component with the at least one directed camera and (ii) a second stream of content displayed with the visual component separate from the video of the content captured with the at least one directed camera;
detect a deactivation related to the at least one of (i) the visual component and (ii) the sensor in response to timing out of the timer without monitored activity; and
redirect the at least one camera to the stored orientation.

13. The system of claim 12, wherein the visual component is selected from a group consisting of a display, a projector screen, an electronic whiteboard, and a dry erase board.

14. The system of claim 12, wherein the sensor is based on optical sensing, infrared sensing, acoustic sensing, physical sensing, or a combination thereof.

15. The system of claim 12, wherein to detect the activation, the videoconferencing unit is configured to detect a signal from a remote control, from a pressure sensitive mat, from an infrared sensor, from a sensor associated with the visual component, in response to a stylus moved from a tray on the visual component, in response to an object coming into proximity of a screen of the visual component, in response to a finger coming into proximity of the screen of the visual component, or in response to a button being depressed on the visual component.

16. The system of claim 12, wherein to direct the at least one camera at the visual component, the videoconferencing unit is configured to move the at least one camera from its current orientation to a new orientation directed at the visual component; and wherein to redirect the at least one camera to the stored orientation at the near-end, the videoconferencing unit is configured to move the at least one camera from its current orientation to the stored orientation.

17. The system of claim 12,
wherein the at least one camera comprises first and second cameras;
wherein to direct the at least one camera at the visual component, the videoconferencing unit is configured to switch from the first camera directed at the current orientation to the second camera directed at the visual component; and
wherein to redirect the at least one camera to the stored orientation at the near-end, the videoconferencing unit is configured to switch from the second camera directed at the visual component back to the first camera associated with the stored orientation.

18. The system of claim 12, wherein to detect the deactivation, the videoconferencing unit is configured to override the timer in response to receiving an exit instruction, receiving an incoming call, or disconnecting from an existing call.

19. The programmable storage device of claim 11, wherein detecting the activation comprises detecting a signal from a remote control, from a pressure sensitive mat, from an infrared sensor, from a sensor associated with the presentation device, in response to a stylus moved from a tray on the presentation device, in response to an object coming into proximity of a screen of the presentation device, in response to a finger coming into proximity of the screen of the presentation device, or in response to a button being depressed on the presentation device.

20. The programmable storage device of claim 11, wherein directing the at least one camera at the presentation device at the near-end comprises moving the at least one camera from its current orientation to a new orientation directed at the presentation device; and wherein redirecting the at least one camera to the stored orientation at the near-end comprises moving the at least one camera from its current orientation to the stored orientation.

21. The programmable storage device of claim 11,
wherein the at least one camera comprises first and second cameras;
wherein directing the at least one camera at the presentation device at the near-end comprises switching from the first camera directed at the current orientation to the second camera directed at the presentation device; and
wherein redirecting the at least one camera to the stored orientation at the near-end comprises switching from the second camera directed at the presentation device back to the first camera associated with the stored orientation.

22. The programmable storage device of claim 11, wherein detecting the deactivation comprises overriding the timer by receiving an exit instruction, receiving an incoming call, or disconnecting from an existing call.

* * * * *